A. J. HALL.
CONTROL SYSTEM.
APPLICATION FILED OCT. 23, 1913.

1,229,444.

Patented June 12, 1917.
2 SHEETS—SHEET 1.

WITNESSES:

INVENTOR
Arthur J. Hall
BY
Wesley G. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,229,444.     Specification of Letters Patent.     Patented June 12, 1917.

Application filed October 23, 1913. Serial No. 796,867.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to systems and apparatus for controlling electric motors, and it has special reference to power-actuated drum controllers and automatic systems embodying the same.

One object of my invention is to provide a relatively simple and compact mechanism for actuating controllers of the drum type that shall be adapted to replace the usual cover and motormen's handles of present manually operated railway controllers, and the operation of which is governed by a small master controller and by electro-responsive devices dependent upon predetermined circuit conditions.

Another object of my invention is to provide a controller actuating device of the character above indicated which shall be so constructed and arranged as to permit of its operation and use, either singly or in multiple with others, for automatically controlling the operation of either single cars or trains composed of any number of cars.

Another object of my invention is to provide means for automatically effecting step-by-step movement of the controller drum, which means shall be dependent in its operation upon the current traversing the motor circuit or upon some other suitable condition of the system.

A still further object of my invention is to provide means responsive to current conditions of the motor circuit for automatically maintaining the motor current during acceleration substantially constant and between two predetermined values.

In a co-pending application, Serial No. 724,063 filed October 5, 1912, by Norman W. Storer and myself, and assigned to the Westinghouse Electric & Manufacturing Company, a system of control embodying my invention is fully shown and described, although the claims incorporated therein relate to the apparatus and system in matters entirely apart from the automatic features thereof which constitute my present invention and which are covered by the claims appended hereto.

Referring to Figs. 1 to 4, inclusive, of the drawings, the structure here shown comprises an operating head 1, a controller of the well known type having a casing 2, a main drum 3, a reversing drum 4, and suitable control fingers associated with each drum.

Figure 1:
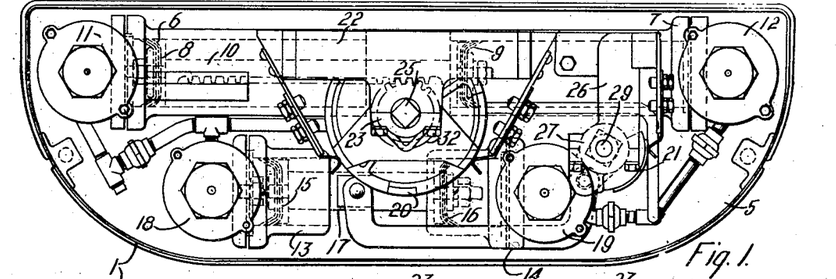
Figure 1 of the accompanying drawings is a plan view, with the cover removed, of a controller operating head which forms a part of my invention.
Figure 2:
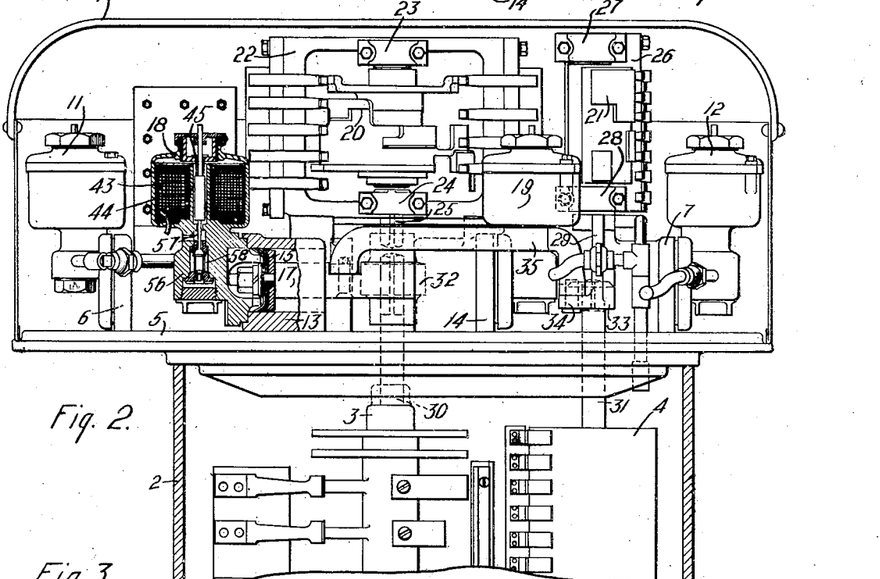
Fig. 2 is a view in side elevation and in section of the operating head of Fig. 1 and the upper portion of a controller with which the head is associated.

The operating head 1 comprises a base plate 5, which constitutes the cover of the casing 2, a pair of cylinders 6 and 7, pistons 8 and 9 operating therein, a connecting rod 10 for the pistons having a rack upon one side for actuating the main drum 3 of the controller, electromagnetically actuated valves 11 and 12 for controlling the supply of compressed air to the cylinders 6 and 7, cylinders 13 and 14, pistons 15 and 16, a connecting rod 17 for the pistons 15 and 16 adapted to actuate the reverse drum 4, electromagnetically controlled valves 18 and 19 for controlling the supply of compressed air to the cylinders 13 and 14, and a pair of auxiliary or control drums 20 and 21 which are respectively coupled to the drums 3 and 4 of the controller and are provided with suitable contact fingers. The cylinders 6, 7, 13 and 14 may form a single casting or may be separately secured to the base plate 5 upon which they are mounted, and the cylinder heads are preferably formed integral with the valve casings with which they are associated.

A yoke 22 is mounted on the cylinder casting and is provided with bearings 23 and 24 in which a shaft 25 of the auxiliary drum 20 is rotatively supported. Another yoke 26 is secured to the cylinder casting and is provided with bearings 27 and 28 in which a shaft 29 of the auxiliary drum 21 is rotatively mounted.

The shafts 25 and 29 are respectively in substantial alinement with shafts 30 and 31 of the drums 3 and 4, to which they are operatively connected by couplings 32 and 33. The coupling 33 is provided with a crank projection 34 which is operatively connected to the piston rod 17 by means of a link 35. The arrangement of parts is such that, when the actuating winding of the valves 18 and 19 are energized, compressed air is admitted through the said valves to the cylinders 13 and 14, and, when the said windings are deenergized, the cylinders are open to the atmosphere and the air pressure within them is relieved.

The coupler 32 is provided with an annular toothed portion which constitutes a pinion and meshes with the teeth of the rack upon one side of the connecting rod 10. The arrangement of parts is such that, when fluid pressure is admitted through the valve 11 to the cylinder 6 and fluid pressure is exhausted through the valve 12 from the cylinder 7, the pistons 8 and 9 and the connecting rod 10 are so actuated as to produce rotative movement of the main drum 3 and the auxiliary or control drum 20.

Figure 3:
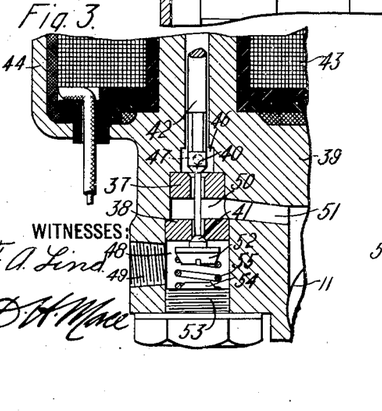
Figs. 3 and 4 are sectional detail views, on a larger scale, of the valves which form parts of the operating head shown in the other figures.
Figure 4:
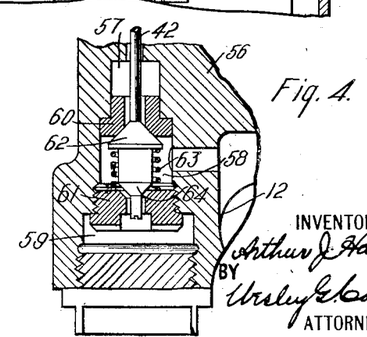

The electromagnetically actuated valves 11, 18 and 19 are substantially alike and each of them is constructed as shown in Fig. 3 of the drawings. The valve 12 is, however, constructed as shown in Fig. 4 of the drawings. Each of the valves 11, 18 and 19 comprises a casting 39 having a vertically extending cylinder chamber, a pair of apertured disks 37 and 38 having frusto-conical valve seats located and spaced apart within the said chamber, a valve stem 42 having frusto-conical plugs 40 and 41 adapted to engage said seats, and a magnet comprising a coil 43, a stationary core member 44, which forms a part of the casting 39, and a movable core member or armature 45 which is secured to the valve stem 42.

The cylindrical chamber in which the disks 37 and 38 are located is divided thereby into an exhaust chamber 46 having an exhaust port 47, an inlet chamber 48 having an inlet port 49, and a pressure chamber 50 with which a passage 51 leading to the cylinder communicates. The lower end of the valve stem 42 is enlarged to form a frusto-conical spring seat 52, and a plug 53, which closes the lower end of the cylindrical chamber, is provided with an opposing conical projection 54, a helical spring 55, which tends to force the plug 41 against its seat and to raise the plug 40 from its seat, being interposed between the members 52 and 54.

When the coil 43 is energized, the armature 45 is moved downwardly to cause the plug 40 to engage its seat and the plug 41 to be released from its seat.

When the plug 40 is raised, the cylinder with which the passage 51 communicates is exhausted through the port 47, and when the plug 41 is lowered, fluid pressure is supplied from any suitable source (not shown) through the inlet port 49.

The magnet valve 12 shown in Fig. 4 differs from that of Fig. 3 in that its exhaust passage is normally closed and its admission passage is normally open. It comprises a casting 56 having a stepped cylindrical chamber which is divided into an exhaust chamber 57, a pressure chamber 58 and an admission chamber 59 by means of apertured disks 60 and 61 having frusto-conical valve seats.

A frusto-conical plug 62 for the exhaust passage coöperates with the seat in the disk 60 and is normally held in engagement therewith by a spring 63, while another plug 64 is, by the same means, normally maintained in a raised position and out of engagement with the corresponding seat in the disk 61. The plugs 62 and 64 are carried by a valve stem 42 that is adapted to be actuated by an electromagnet similar to that shown in Figs. 2 and 3, the plug 62 being lowered away from its seat when the electro-magnet is energized and the plug 64 being caused to engage its seat.

In view of the foregoing, it is evident that if the actuating electromagnets of the valves 18 and 19 are both deënergized, atmospheric pressure will exist in the cylinders 13 and 14, and, accordingly, no movement of the pistons 15 and 16 or of the reverser and auxiliary drums 4 and 21 will occur, while if one is energized and the other is deënergized, the pistons, the connecting rod 17 and the link 35 will be moved away from the valve, the electromagnet of which is energized. In order, therefore, to actuate the reverser drum 4 and the auxiliary control drum 21, it is only necessary to energize the actuating winding of the valve in the opposite direction to that which it is desired to move the pistons 15 and 16.

Since the valves 11 and 12 are different in construction, that is, since the valve parts in the one are in inverse relation to those in the other, full pressure will normally exist in the cylinder 7, while pressure will be exhausted from the cylinder 6 when the actuating windings of both magnets are deënergized, and, therefore, the drum 3 and the control drum 20 will be moved into or held in their "off" positions.

In order to advance the said drums, it is only necessary to energize the actuating windings of both the valves 11 and 12, thereby introducing full pressure to the cylinder 6, and exhausting pressure from the cylinder 7. The drums may be stopped and held indefinitely in any position by merely deënergizing the actuating winding of the valve 12, while energy is supplied to the winding of the valve 11, or, in other words, by restoring full balanced pressure in the cylinders 6 and 7.

The auxiliary or control drum 20, as hereinafter pointed out, is adapted to govern the energization of the actuating windings for the valves 11 and 12, while the control drum 21 is adapted to govern the energization of the windings of the reverser valves 18 and 19.

Figure 5:
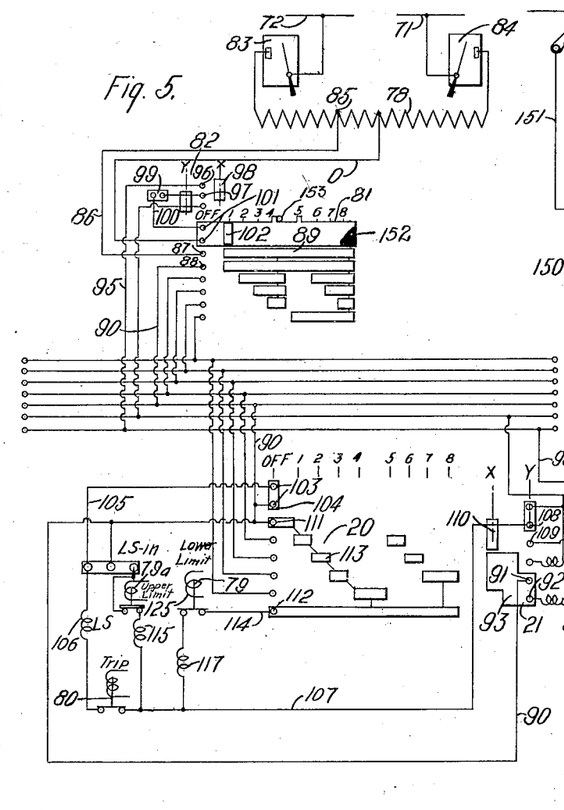
Figs. 5 and 6 are respectively a diagrammatic view of the control circuits and a diagrammatic view of the motor circuits of a system embodying my invention.
Figure 6:
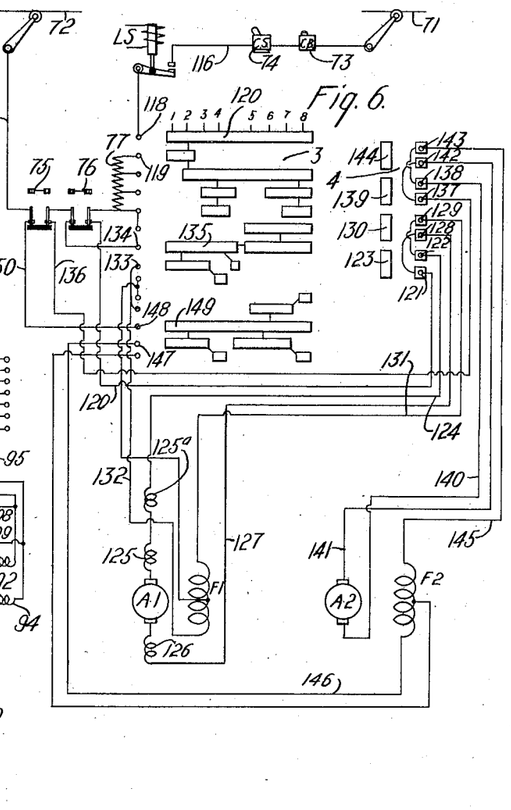

Referring to Figs. 5 and 6 of the drawings, which may be considered as a single diagram, the control system here shown comprises a positive supply circuit conductor 71, a negative line conductor 72, an automatic circuit breaker 73, a canopy switch 74, a line switch marked LS, the main control drum 3, the reversing drum 4, a pair of cut-out switches 75 and 76, an accelerating resistor 77, a pair of electric motors having armatures $A^1$ and $A^2$, and field magnet windings $F^1$ and $F^2$, a control circuit resistor 78, the auxiliary or control drum 20, the reversing auxiliary or control drum 21, limit switches 79 and $79^a$ respectively, marked "Lower limit" and "Upper limit," an overload trip relay switch 80, a main master switch 81 and a reversing master switch 82.

The control circuit resistor 78 is connected directly between the supply circuit conductors 71 and 72, when a pair of switches 83 and 84 are closed.

The master reverser 82 is adapted to occupy positions $x$ and $y$ and the master switch 81 is adapted to occupy an "off" position and a plurality of motor-operating positions 1 to 8, corresponding to the various positions of the main control drum 3.

Assuming that the master reverser 82 is thrown to position $x$ and that the master switch 81 is moved into position 1, a circuit is established from an intermediate tap 85 in the resistor 78, to a conductor 86, contact fingers 87 and 88, which are bridged by a contact member 89, a conductor 90, contact fingers 91 and 92 of the auxiliary reverser drum 21 which are bridged by a contact member 93, actuating coil 94 of the valve 18, a conductor 95, contact fingers 96 and 97, which are bridged by a contact member 98 of the master reverser 82, an emergency cut-out switch 99, a conductor 100, contact fingers 101, which are bridged by a contact member 102, and a conductor marked 0 to substantially the middle point in the control resistor 78.

The coil 94 of the valve 18 being now energized, causes fluid pressure to be admitted to the cylinder 13, with the result that the reverser drum 4 and the auxiliary drum 21 are moved to the position $x$. In this position, the finger 92 is disengaged from the contact member 93 and, consequently, the coil 94 is deënergized so that fluid pressure is released from the cylinder 13 in order that the reverser may be ready for subsequent operation in the opposite direction.

A circuit is concurrently completed from the conductor 90, through contact fingers 103, which are bridged by a contact member 104 when the controller 20 occupies its "off" position, a conductor 105, a coil 106 of the line switch, the trip relay switch 80, a conductor 107, contact fingers 108 and 109, which are bridged by a contact member 110 of the control reverser 21, the conductor 95, etc. to the conductor 0. The line switch is thus closed and a holding circuit is established for the coil 106 from the conductor 90, through the interlocking contact members marked LS—in.

As soon as the line switch closes, a circuit is established from conductor 90, through the interlocking contact members LS—in, "upper limit" $79^a$, actuating coil 115 of the valve 11, and the conductor 107, etc. to the 0 conductor. By reason of the energization of the coil 115 of valve 11, fluid pressure is admitted to the cylinder 6. However, no movement of the pistons 8 and 9 occurs at this time because balanced pressures exist in the cylinders 6 and 7.

A connection is concurrently established from the conductor 90 through contact fingers 111 and 112, which are bridged by a contact member 113 of the auxiliary drum 20, a conductor 114, "lower limit" 79, actuating coil 117 of the valve 12, and conductor 107, etc. to the 0 conductor. Fluid pressure is consequently released from the cylinder 7, and the drums 3 and 20 are moved forward until the contact finger 111 becomes disengaged from the member 113. This occurs as soon as control drum 20 occupies position 1. At this point in the operation, the coil 117 of the valve 12 is deënergized, thereby restoring balanced pressures in the cylinders 6 and 7 and holding the drums 3 and 20 in position 1.

Upon the movement of the drum 3, a motor circuit is established from conductor 71, through the circuit breaker 73, canopy switch 74, a conductor 116, the line switch LS, contact fingers 118 and 119, which are bridged by a contact member 120 of the controller 3, the accelerating resistor 77, one blade of the cut-out switch 76, a conductor 120, contact fingers 121 and 122, which are bridged by a contact member 123 of the reverser, a conductor 124, actuating coils $125^a$ and 125 of the "upper limit" $79^a$ and "lower limit" 79, armature $A^1$, actuating coil 126 of the overload trip relay switch 80, a conductor 127, contact fingers 128 and 129, which are bridged by a contact member 130, a conductor 131, field magnet winding $F^1$, a conductor 132, contact fingers 133 and 134, which are bridged by a contact member 135, the other blade of the motor cut-out switch 76, and one blade of the cut-out switch 75, a conductor 136, contact fingers 137 and 138, which are bridged by a contact member 139, a conductor 140, armature $A^2$, a conductor 141, contact fingers 142 and 143, which are bridged by a contact member 144, a conductor 145, field magnet winding $F^2$, a conductor 146, contact fingers 147 and 148, which are bridged by a contact member 149, conductor 150, the other blade of motor cut-out switch 75 and a conductor 151 to the opposite line conductor 72.

The motors are thus connected in series relation, with the resistor 77 and the energizing coils of both limit switches 79 and $79^a$ included in circuit therewith. By reason of the completion of the main motor circuit, just recited, energy is supplied to the driving motors and they are accordingly started into operation and are accelerated up to a speed corresponding to the first position of the controller.

The acceleration of the motors will not progress so long as the master switch 81 remains in position 1, but if the master switch is moved successively through its positions 2, 3 and 4, the coil 117 of the valve 12 is alternately energized and deënergized, and the drums 3 and 20 will move forward through the corresponding positions step-by-step, but dependent upon the action of the "lower limit" 79. Thus, the resistance of the motor circuit is gradually eliminated, thereby causing the motors to accelerate in speed.

The "lower limit" coil 125 is so designed as to lift the switch 79 when the motor current exceeds a predetermined amount in accordance with customary practice, while the "upper limit" coil $125^a$ is only adapted to act when a predetermined greater current traverses the motor circuit. When the motor current raises the "lower limit" 79, further progression of the controller is prevented because of the interruption of the energizing circuit of coil 117 of valve 12 which causes the admission of pressure to cylinder 7 and holds the controller drum at rest. As soon as the current falls and permits the "lower limit" 79 to close, coil 117, is again energized and the valve 12 exhausts cylinder 7 and allows the piston 8 to advance the controller to its next step.

If, however, the motor current becomes excessive and greater than the value for which the "upper limit" $79^a$ is adjusted, its switch is also raised. Thus, coil 115 of valve 11 is deënergized and cylinder 6 is opened to the atmosphere, thereby causing the controller to be moved backward to cut in a portion of the accelerating resistance 77, by reason of the pressure in cylinder 7, already effected by the raising of the "lower limit" 79. When sufficient resistance has been cut into circuit to reduce the motor current to a normal value, "upper limit" $79^a$ falls, and balanced pressures are restored. Subsequently, the operation may proceed in accordance with circuit conditions and the will of the operator.

It is evident, therefore, that the automatic operation is dependent upon the action of two current relays or limit switches and the motor current is maintained between two predetermined values, so that the acceleration is smooth and substantially uniform.

One of the predetermined values referred to is the normal value of the accelerating current, as maintained substantially constant through the action of the "lower limit," which functions in the usual manner of automatic limit switches.

The upper value is that to which the current is limited under abnormal accelerating conditions by means of the "upper limit." It is evident, therefore, that the accelerating current of the system set forth may vary, and the limits of its variation are those prescribed by the two limit switches. The accelerating current, therefore, is permitted to vary between two predetermined values, and hence is maintained between such values.

The controller 3 is adapted to effect a well-known series-parallel control for the motors and need not be described in detail. As to the controller 20, the contact member 113 is so subdivided and arranged as to interrupt the circuit established through the coil 117 of the magnet valve 12 as each control position is reached. Each successive forward movement is thus dependent both upon the limit switches and the position of the master controller.

The contact member 102 is mounted on an insulating ring 152 that is connected to the drum of the master controller 81 by a friction clutch or similar connection and is limited in its rotative movement by a stationary pin or stop 153 which permits it to move only into engagement with the fingers 101. The arrangement of parts is such that when the master switch is moved into its position 1, the friction clutch connection carries the contact member 102 into engagement with the fingers 101 and the stop 153 holds it in this position as long as the master switch progresses forwardly, but any backward movement of the master switch, whether it be from the position 8 or from same intermediate position, will move the contact member 102 out of engagement of the fingers and will break the circuit at this point.

From the circuits above traced, it is evident that, as soon as the circuit is interrupted between the fingers 101, the line switch will be opened and the coils of the valve 11, 12, 18 and 19 will be deënergized. While this will produce no movement of the reverser 21, it will throw the drums 3 and 20 to their off positions, as hereinbefore pointed out.

Obviously, the circuit connections of the system may be varied considerably and the operating head may also be greatly modified as to its structural features and may be employed to operate any form of drum controller or regulator, without departing from the spirit and scope of my invention, and I, therefore, do not wish my invention limited to the specific details herein disclosed.

I claim as my invention:

1. In a system of control, the combination with an electric motor, a controller adapted to occupy a plurality of positions for governing said motor, an electrically controlled fluid operated power device for actuating said controller by the continued application of fluid pressure, and a master controller for governing the operation of said power device, of electro-responsive means dependent upon the motor current for automatically governing a control circuit of said power device.

2. In a system of control, the combination with an electric motor, a controller adapted to occupy a plurality of positions for governing said motor, an electrically controlled fluid operated power device for actuating said controller by the continued application of fluid pressure, and a master controller for governing the operation of said power device, of automatic means for governing a control circuit of said power device in accordance with predetermined conditions of the motor circuit.

3. In a system of control, the combination with an electric motor, a controller adapted to occupy a plurality of positions for governing said motor, an electrically controlled fluid operated power device for actuating said controller by the continued application of fluid pressure, and a master controller for governing the operation of said power device, of a current-limit device having an energizing coil in said motor circuit, and a switching device in the energizing circuit of said actuating power device for effecting an automatic acceleration of said motor.

4. In a control system, the combination with an electric motor, a controller for governing said motor, electro-pneumatic means for actuating said controller by steps by the continued application of fluid pressure, a master controller for manually controlling said actuating means, and an auxiliary control drum associated with said controller for governing an energizing circuit of said actuating means, of an electro-responsive device connected in said motor circuit and dependent upon the current traversing said circuit for acting in conjunction with said auxiliary control drum for automatically governing the energizing circuit of said actuating means.

5. In a control system, the combination with an electric motor, a controller for governing said motor, and an electrically controlled fluid operated device for actuating said controller and comprising a cylinder, a movable piston and means for admitting fluid to one side of said piston and for releasing it from the other side thereof for actuating said controller, and for admitting fluid to both sides of the piston to hold said controller stationary, of means responsive to the current traversing said motor circuit for automatically governing the operation of said electrically controlled actuating device.

6. In a control system, the combination with an electric motor, a controller for governing said motor, and an actuator for said controller comprising a cylinder, a movable piston and electrically controlled valves at each end of said cylinder for admitting an operating fluid to and withdrawing it from said cylinder, of a manually operated master controller for governing the circuits of said electrically controlled valves, and a current-limit device for automatically governing the energizing circuit of one of said valves in accordance with predetermined conditions of the motor circuit.

7. In a control system, the combination with an electric motor, a controller for governing the operation of said motor, and an actuating device for said controller comprising a cylinder, a movable piston and electrically controlled valves governing the admission and release of an operating fluid at the respective sides of said piston, of a manually operated master controller, an auxiliary interlock controller associated with the motor controller, and an electro-responsive switching device dependent upon predetermined conditions of the motor circuit, for conjointly governing the control circuits of said valves.

8. In a control system, the combination with an electric motor, a controller for governing the operation of said motor, and an actuator for said controller comprising a cylinder and a piston movable therein, valves governing the admission of fluid pressure and its release from the respective ends of said cylinder, electromagnets for respectively actuating said valves, and means governing the circuits of the electromagnets whereby one of them is continuously energized to admit fluid pressure to one end of the cylinder to effect forward movement of the piston, and whereby the other is energized when it is desired to permit a forward movement of the piston and is deënergized when it is desired to stop said forward movement, of a current-limit device connected in the motor-circuit and having its switch members adapted to open and close the energizing circuit of the second electromagnet to automatically effect a step-by-step movement of said main controller in accordance with predetermined current conditions.

9. A control system comprising a drum controller for governing an electric motor, an actuating mechanism for the drum controller comprising a piston and a cylinder, and valve magnets for governing the admission and release of fluid pressure to and from the cylinder, an auxiliary controller operatively connected to the drum controller, a master switch coöperating with the auxiliary controller for governing the magnet valves, and means dependent upon predetermined conditions in the motor circuit for interrupting the control circuit of one of said magnet valves for delaying the advancement of the drum.

10. A control system comprising a drum controller for governing an electric motor, an actuating mechanism for the drum controller comprising a piston and a cylinder and valve magnets for governing the admission and release of fluid pressure to and from the cylinder, a master controller, means dependent upon the controller for governing the magnet valves, and a limit switch dependent upon predetermined conditions in the motor circuit for interrupting the energization of one of the magnet valves.

11. A control system for an electric motor comprising a drum controller, an operating head therefor comprising a pair of pistons operatively connected to the drum, cylinders in which the pistons operate, magnet valves for controlling the admission and release of fluid pressure to and from the cylinders, one of said valves being normally open and the other normally closed when deënergized, whereby the drum controller is biased to its off position, a master controller for governing the supply of energy to the magnet valves, and a limit switch dependent upon the current in the motor circuit for delaying the supply of energy to one of said valves.

12. A control system comprising a drum controller, a control drum operatively connected to the drum controller, an operating head therefor, comprising a pair of pistons operatively connected to the drum controller and the control drum, cylinders in which the pistons operate, magnet valves for controlling the admission of fluid pressure to the cylinders, one of said valves being normally open and the other normally closed when deënergized, whereby the drum controller is biased to its off position, a master controller coöperating with the control drum for governing the magnet valves to produce a step-by-step movement of the drum controller, and a limit switch dependent on the current in the motor circuit for interrupting the circuit of one of the magnet valves under predetermined conditions, whereby the advancement of the drum is delayed.

13. In a system of control, the combination with an electric motor, a controller adapted to occupy a plurality of positions, an electrically controlled power device for actuating said controller, and a master controller for governing the operation of said power device, of a plurality of electro-responsive devices dependent upon different predetermined conditions of the motor circuit for causing said power device to move said controller in opposite directions to govern the operation of said motor and maintain the accelerating current between predetermined limits.

14. In a system of control, the combination with an electric motor, a resistor, a controller adapted to occupy a plurality of positions for arranging the circuits of said resistor, an electrically controlled power device for actuating said controller, and a master controller for governing the operation of said power device, of means dependent upon different conditions of the motor circuit for maintaining the motor current during acceleration between predetermined limits.

15. In a system of control, the combination with an electric motor, a resistor, a controller adapted to occupy a plurality of positions for arranging the circuits of said resistor, an electrically controlled power device for actuating said controller and a master controller for governing the operation of said power device, of a plurality of current-limit devices for governing the operation of said power actuating device to effect adjustments of said controller in accordance with different current conditions for maintaining the accelerating current between predetermined values.

16. In a system of control, the combination with an electric motor, a controller adapted to occupy a plurality of positions for governing the operation of said motor, an electrically controlled power device for actuating said controller, and a master controller for governing the operation of said power device, of automatic means for selectively causing said power actuating device to move said controller forward or backward in accordance with predetermined conditions of the motor circuit and to maintain the accelerating current between predetermined limits.

17. In a control system, the combination with an electric motor, a controller for governing the operation of said motor, and an actuating device for said controller comprising a cylinder, a movable piston and electrically controlled valves governing the admission and release of an operating fluid at the respective ends of said piston, of a plurality of electro-responsive means respectively adapted to govern the energizing circuits of said electrically controlled valves in accordance with different predetermined current conditions of the motor circuit.

18. In a control system, the combination with an electric motor, a controller governing the operation of said motor, and an actuating device for said controller comprising a cylinder, a movable piston and electrically controlled valves governing the admission and release of an operating fluid at the respective ends of said piston, of a plurality of current-responsive devices adjusted for different motor currents for severally causing said electrically controlled valves to operate to effect forward and reverse movements of said piston and controller in accordance with motor circuit conditions.

19. The combination with an electrical circuit, translating means connected thereto, and a regulating device associated with said circuit, of a plurality of electro-responsive means for governing the operation of said regulating device in accordance with different load conditions of said circuit and for maintaining the load between predetermined limits.

20. The combination with an electrical circuit, translating means connected thereto, and an adjustable resistor associated with said circuit, of a plurality of current limit devices respectively responsive to different amounts of current traversing said circuit for causing said adjustable resistor to cut in or cut out resistance in accordance with load conditions for maintaining the load between predetermined limits.

21. The combination with an electrical circuit, translating means and controlling means associated therewith, of means for actuating said controlling means, and automatic electro-responsive means dependent upon different conditions of load on said translating means for causing said actuating means to adjust said controlling means to maintain said load between predetermined limits.

22. In a system of control, the combination with an electric motor, a controller adapted to occupy a plurality of positions for governing the operation of said motor and an electrically-controlled fluid-operated device for actuating said controller and comprising a cylinder, a movable piston therein and a plurality of electromagnetic valves for governing the operation of said fluid operated device, of electro-responsive means dependent upon the motor current for automatically governing a control circuit of one of said electromagnetic valves.

23. In a control system, the combination with an electric motor, a controller for governing the operation of said motor and an electrically-controlled fluid-operated device for actuating said controller and comprising a cylinder, a movable piston and a plurality of valves associated with the respective ends of said cylinder, of means responsive to the current traversing said motor for automatically governing the operation of said electrically controlled actuating device.

24. In a control system, the combination with an electric motor, a controller for governing the operation of said motor and an electrically-controlled fluid-operated device for actuating said controller and comprising a cylinder, a movable piston and a plurality of valves associated with the respective ends of said cylinder, of an auxiliary control drum associated with said controller and electro-responsive means dependent upon motor current for conjointly governing the controlling circuit of one of said valves of said electrically controlled actuating device.

25. In a control system, the combination with an electric motor, a controller for governing the operation of said motor and an electrically-controlled fluid-operated device for actuating said controller by the continued application of fluid pressure, of a manually operated master controller, an auxiliary interlock controller associated with the motor circuit controller and electro-responsive means dependent upon conditions of the motor circuit for conjointly governing a control circuit of said electrically controlled actuating device.

26. The combination with an electric motor, a controller for governing the operation thereof and an actuator for said controller comprising a cylinder, a movable piston, and a plurality of electromagnetic valves associated with the opposite ends of said cylinder, of means for governing the control circuits of said electromagnetic valves whereby one of them is continuously energized and the other intermittently energized to effect step-by-step movements of said piston, and automatic means for governing the control circuit of said second electromagnetic valve in accordance with circuit conditions.

27. In a system of control, the combination with an electric motor, a controller adapted to occupy a plurality of positions for governing the operation of said motor, and an electrically-controlled power device for actuating said controller, of a master controller for governing the operation of said power device, and a plurality of electro-responsive devices for automatically governing said electrically-controlled power device to maintain the load upon said motor between predetermined limits.

28. In a system of control, the combination with an electric motor, a controller adapted to occupy a plurality of positions for governing the operation of said motor, and an electrically-controlled power device for actuating said controller and comprising a cylinder, a piston therein and a plurality of valves associated with the respective ends of said cylinder, of means for independently and automatically influencing the action of the respective valves in accordance with different current conditions.

29. In a system of control, the combination with an electric motor, a controller for governing the operation thereof and an electrically-controlled fluid-operated mechanism for actuating said controller in opposite directions and embodying a plurality of electro-magnetically controlled valves, of a plurality of electro-responsive relays dependent upon different conditions of the motor circuit for independently governing the operation of the respective valves, whereby the direction of movement of the controller is determined.

30. In a system of control, the combination with an electric motor, a controller for governing the operation thereof, and an electrically-controlled fluid-operated mechanism for actuating said controller in opposite directions, of controllable means for governing the operation of said mechanism, and a plurality of current limit devices severally responsive to different current conditions for acting in conjunction with said controllable means for determining the direction of operation of said controller and maintaining the load upon said motor between predetermined limits.

31. In a system of control, the combination with an electric motor, a controller for governing the operation thereof and an electrically-controlled fluid-operated mechanism for actuating said controller in opposite directions, and comprising an operating cylinder, a movable piston therein and a plurality of electrically-controlled valves associated with the respective ends of said cylinder, of a plurality of electro-responsive relays dependent upon different conditions of the motor circuit for severally governing the energizing circuits of the respective valves.

32. The combination with an electric circuit, a device to be actuated and an electrically-controlled fluid-operated actuating device therefor comprising an operating cylinder, a piston therein and a plurality of electrically-controlled valves for governing the admission and release of operating fluid to and from said cylinder, of a plurality of means respectively responsive to conditions of said electrical circuits for independently governing the energizing circuits of the respective electrically-controlled valves.

33. The combination with an electric circuit, a device to be actuated and an electrically-controlled fluid-operated actuating device therefor comprising an operating cylinder, a piston therein and a plurality of electrically-controlled valves for governing the admission and release of operating fluid to and from said cylinder, of a plurality of current relays severally responsive to different current conditions of the electric circuit and severally adapted to govern the energizing circuits of the respective electrically-controlled valves and to determine the direction of operation of said device to be actuated.

34. In a control system, the combination with an electric motor, a controller for governing the operation thereof, and an actuating device for said controller comprising a cylinder, a movable piston and electrically-controlled valves associated with said cylinder and adapted to govern the direction of operation of said piston, of a plurality of current relays adjusted for different current values for severally causing the respective electrically-controlled valves to operate to effect forward and reverse movements of said piston in accordance with circuit conditions.

35. The combination with an electric circuit, translating means connected thereto, and means for governing the operation of said translating means, of a plurality of electro-responsive devices dependent upon different conditions of said electrical circuit for regulating the operation of said translating means and maintaining the load thereof between predetermined limits.

36. In a control system, the combination with an electric motor, a controller for governing the operation thereof and an electrically-controlled power-device for actuating said controller, of means for governing the operation of said power device and adapted to effect movements thereof in opposite directions, electro-responsive means coöperating with said governing means for arresting the movement of said power device under predetermined conditions, and other electro-responsive means coöperating with said governing means and with said first electro-responsive means for effecting a reversal of the direction of movement of said power device under other predetermined circuit conditions.

37. In a control system, the combination with an electric motor, a controller for governing the operation thereof and an electrically-controlled power-device for actuating said controller, and comprising an operating cylinder, a piston therein and a plurality of valves associated with said cylinder, of electrical means for governing the operation of said valves to effect movements of said actuating device and said controller in opposite directions, of a relay influenced by the motor current for governing the energizing circuit of one of said valves to arrest movements of said actuating device in one direction, and another relay responsive to different current conditions for governing the energizing circuit of another valve for reversing the direction of operation of said actuating device when the motor current exceeds a predetermined abnormal value.

38. In a control system, the combination with an electric motor, a controller for governing the operation thereof, an electrically-controlled fluid-operated actuating device therefor, and controllable means for causing said actuating device to move said controller in one direction, of electro-responsive means dependent upon abnormal current conditions for acting in conjunction with said controllable means for automatically reversing the direction of operation of said actuating device and associated controller under predetermined circuit conditions.

39. In a control system, the combination with an electrical circuit, a device to be actuated and an actuator therefor comprising an operating cylinder, a piston therein, and electromagnetic means for governing the operation of said actuator, of automatic means responsive to current conditions for coöperating with said electro-magnetic control means to effect a reversal in the direction of operation of said actuator and associated controller under predetermined current conditions.

40. In a control system, the combination with an electric motor, a controller for governing the operation thereof, and an electrically-controlled fluid-operated power device for actuating said controller in opposite directions and comprising a cylinder, a piston therein and a plurality of electrically-controlled valves associated with the respective ends of said cylinder for governing the admission and release of operating fluid to and from said cylinder, of a master controller for governing the operation of said valves, a current relay for governing the energizing circuit of one of said valves and a second current relay responsive to different current conditions for governing the energizing circuit of the other of said valves whereby the direction of operation of said actuating device is determined.

41. In a system of control, the combination with an electric translating device and a regulating device therefor comprising a fluid container, movable means contained therein and electrically controlled valves disposed at the respective ends of said fluid container, of electro-responsive means for governing the operation of at least one of said electrically controlled valves in accordance with the load conditions upon said translating device.

42. The combination with an electric circuit, and electrically controlled fluid-actuated means for varying the electrical conditions of said circuit, said means embodying a cylinder, a movable piston and electrically controlled valves at the respective ends of said cylinder, of automatic means responsive to electrical conditions of said circuit for governing the operation of one of said electrically operated valves.

In testimony whereof, I have hereunto subscribed my name this 17th day of October 1913.

ARTHUR J. HALL.